(12) United States Patent
Tora

(10) Patent No.: US 12,388,866 B2
(45) Date of Patent: *Aug. 12, 2025

(54) SYSTEMS AND METHODS FOR MALICIOUS URL PATTERN DETECTION

(71) Applicant: Saudi Arabian Oil Company, Dhahran (SA)

(72) Inventor: Aminullah Sayed Tora, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 558 days.

This patent is subject to a terminal disclaimer.

(21) Appl. No.: 17/182,660

(22) Filed: Feb. 23, 2021

(65) Prior Publication Data

US 2022/0272125 A1    Aug. 25, 2022

(51) Int. Cl.
*H04L 9/40* (2022.01)
*G06F 18/24* (2023.01)
(Continued)

(52) U.S. Cl.
CPC .......... *H04L 63/1483* (2013.01); *G06F 18/24* (2023.01); *G06N 3/082* (2013.01); *G06N 20/00* (2019.01)

(58) Field of Classification Search
CPC ........ G06N 20/00; G06F 18/24; G06F 18/213
See application file for complete search history.

(56) References Cited

U.S. PATENT DOCUMENTS 8,521,667 B2 * 8/2013 Zhu .................... H04L 63/1408 706/13
9,178,901 B2 * 11/2015 Xue .................... H04L 63/1483
(Continued)

FOREIGN PATENT DOCUMENTS

CN    112424769 A  *  2/2021  .......... G06F 16/783
EP      3340570 A1      6/2018

OTHER PUBLICATIONS

Le, Hung, et al. "URLNet: Learning a URL representation with deep learning for malicious URL detection." arXiv preprint arXiv: 1802.03162 (2018).*

(Continued)

*Primary Examiner* — Luu T Pham
*Assistant Examiner* — Paul J Skwierawski
(74) *Attorney, Agent, or Firm* — Leason Ellis LLP

(57) ABSTRACT

A system for identifying and classifying malicious URLs comprising one or more processors having access to program instructions that when executed generate a queue module configured to receive a file including a potentially malicious URL from a source, a feature selector module configured to select features of interest to identifying URLs extracted from the file, a vectorizing module configured to generate vectorized feature data from the features, a feature generation module configured to generate URL data features with reduced dimensionality from the vectorized data using autoencoding techniques, a model handler module configured to select an artificial intelligence/machine learning (AI/ML) model to analyze the URL data features with reduced dimensionality, to transmit the model for execution, and to receive the results of the execution of the selected AI/ML model, and a visualizer module configured to provide a rendering of results of the execution of the selected AI/ML model.

12 Claims, 5 Drawing Sheets

(51) Int. Cl.
*G06N 3/082* (2023.01)
*G06N 20/00* (2019.01)

(56) References Cited

U.S. PATENT DOCUMENTS

| | | | |
|---|---|---|---|
| 9,215,244 | B2 | 12/2015 | Ayyagari et al. |
| 9,537,880 | B1 | 1/2017 | Jones et al. |
| 10,341,372 | B2 | 7/2019 | Chari et al. |
| 10,341,391 | B1 | 7/2019 | Pandey et al. |
| 10,387,889 | B1 * | 8/2019 | Hanna ............... G06Q 50/01 |
| 11,595,437 | B1 * | 2/2023 | Mushtaq ............ H04L 63/1483 |
| 2013/0080376 | A1 * | 3/2013 | Yao ..................... G06N 7/02 |
| | | | 706/52 |
| 2014/0298460 | A1 | 10/2014 | Xue et al. |
| 2017/0002663 | A1 | 1/2017 | Riza |
| 2017/0232633 | A1 | 9/2017 | Miserendino et al. |
| 2018/0004135 | A1 | 2/2018 | Berlin |
| 2018/0041536 | A1 * | 2/2018 | Berlin ................ H04L 63/1416 |
| 2021/0034980 | A1 | 2/2021 | Xia et al. |
| 2021/0236044 | A1 | 8/2021 | Arroyo-Gallego et al. |
| 2022/0237442 | A1 | 7/2022 | Gligorijevic et al. |
| 2023/0045882 | A1 | 2/2023 | Yamamoto |
| 2023/0350931 | A1 | 11/2023 | Lewis et al. |

OTHER PUBLICATIONS

Abawajy, Jemal H., et al. "Iterative Construction of Hierarchical Classifiers for Phishing Website Detection." J. Networks 9.8 (2014): 2089-2098.*
Mushtaq U.S. Appl. No. 63/013,905, filed Apr. 22, 2020.*
CN112424769A_Engl (Year: 2021).*
Le et al. "URLNet: Learning a URL representation with deep learning for malicious URL detection." arXiv preprint arXiv:1802.03162 (2018).
Elshawi et al., "Automated machine learning: State-of-the-art and open challenges." arXiv preprint arXiv: 1906.02287 (2019).
He, Xin et al., "AutoML: A Survey of the State-of-the-Art." Knowledge-Based Systems 212 (2021): 106622.
Kazak, Veronica. "Unsupervised Feature Extraction with Autoencoder: for the Representation of Parkinson's Disease Patients. ." Repositorio Universidade Nova, Apr. 3, 2019. 83 pages.
Raschka, Sebastian et al.,. "Machine learning in python: Main developments and technology trends in data science, machine learning, and artificial intelligence." Information 11.4 (2020): 193.
Mallela, Prahaladha. An Extensible, Scalable, and Continuously Adaptive Machine Learning Layer for the Internet-of-Things. Diss. Carnegie Mellon University Pittsburgh, PA, 2019.
1 Office Action in corresponding Saudi Arabian Application No. 122430688 dated Jun. 1, 2024; 9 pages.

* cited by examiner

SYSTEMS AND METHODS FOR MALICIOUS URL PATTERN DETECTION

FIELD OF THE DISCLOSURE

The present invention relates to information technology (IT) security, and, more particularly, relates to a system and method for detecting malicious universal resource locators (URLs) in received communications and other data sources using a machine learning platform.

BACKGROUND OF THE DISCLOSURE

Malicious URLs are internet links that are created for the purpose of promoting scams, attacks, frauds and espionage. Execution of a malicious URL link at a computing device can cause viruses, malware, spyware or ransomware to be downloaded to the device and can thereby be communicated to further devices networked to the originally infected device. Due to the numerous dangers that malicious URLs can cause, malicious URL identification and blocking has become a critical operation for businesses and internet service providers.

Standard techniques for identifying malicious URLs include looking up a potentially malicious URL in a blacklist that includes known malicious domain names, hosts, and website content. Many services now provide and attempt to continually update such blacklists. A main challenge of this approach here is that bad actors can circumvent the blacklists by modifying or otherwise obscuring their URL metadata.

In the recent past, more analytical approaches have been deployed for malicious URL identification that supplement the blacklist method. Analytical software platforms dedicated to detecting specific unusual features that are indicative of malicious URLs have been developed. Some of the platforms utilize artificial intelligence and machine learning techniques. For example, U.S. Pat. No. 9,187,901 is directed to a supervised machine learning URL classification system that makes a determination as to the suspiciousness of a URL by extracting and parsing lexical features from the URL and the communication in which the URL is embedded.

However, to the best of the inventors' knowledge, the solutions deployed thus far are limited in scope in that they prescribe a single approach for classifying URLs or otherwise lack flexibility and comprehensiveness in their approaches to solving the problem of identifying malicious URLs. The lack of flexibility and comprehensiveness is a particular drawback in this field in which attach strategies are continually evolving and in which the best way to extract and interpret features of the malicious URL is not always clear beforehand. It is with respect to these limitations of existing systems and methods that the inventor directed his technical solution.

SUMMARY OF THE DISCLOSURE

The present disclosure describes a non-transitory computer-readable medium comprising instructions which, when executed by a computer system, cause the computer system to carry out a method of malicious URL identification and classification. The method includes steps of receiving a file including a potentially malicious URL from a source, extracting features from the file, vectorizing the extracted features using a plurality of vectorization techniques into vectorized feature data, generating URL data features with reduced dimensionality from the vectorized feature data using a plurality of autoencoding techniques, selecting an artificial intelligence/machine learning (AI/ML) model to analyze the URL data features with reduced dimensionality, receiving results of an execution of the selected AI/ML model that includes an identification and classification of the potential malicious URL, and providing a visualization of results of the execution of the selected AI/ML model.

In another aspect, the present disclosure describes a system for identifying and classifying malicious URLs comprising one or more processors, the processors having access to program instructions that when executed, generate the following modules: a queue module configured to receive a file including a potentially malicious URL from a source; a feature selector module configured to select features of interest to identifying URLs extracted from the file; a vectorizing module configured to generate vectorized feature data form the features selected by the feature selector module using a plurality of vectorization techniques; a feature generation module configured to generate URL data features with reduced dimensionality from the vectorized feature data using a plurality of autoencoding techniques; a model handler module configured to selecting an artificial intelligence/machine learning (AI/ML) model to analyze the URL data features with reduced dimensionality, to transmit the model for execution, and to receive the results of the execution of the selected AI/ML model; and a visualizer module configured to provide a rendering of results of the execution of the selected AI/ML model.

DETAILED DESCRIPTION OF CERTAIN EMBODIMENTS OF THE DISCLOSURE

Disclosed herein is a comprehensive platform that enables AI/Machine learning to be applied to malicious URL pattern detection and classification. The platform provides several distinct state machine modules that perform tasks including data collection, transfer, identification, recursive extraction, feature identification & selection, vectorization, and autoencoding. These steps are preparatory to and are used as inputs to further modules that perform machine learning feature extraction, algorithm selection, model structure and hyperparameter selection, and model training and prediction. The platform machine learning models are used to identify malicious URL patterns and to classify them by data parsing, data enrichment, feature identification, feature extraction, model development, training, testing, and re-training. All of these steps are performed so as to have operator supervision in the event that fine tuning is desired of data inputs and parameters used by the modules to optimize prediction accuracy.

At the outset it is noted that the term "module", used in the description and accompanying figures, is defined as program code and associated memory resources, that when read and executed by a computer processor, perform certain defined procedures. For example, an "vectorizer module" comprises program code that when executed by a computer processor, performs procedures related to vectorization of data.

Figure 1:
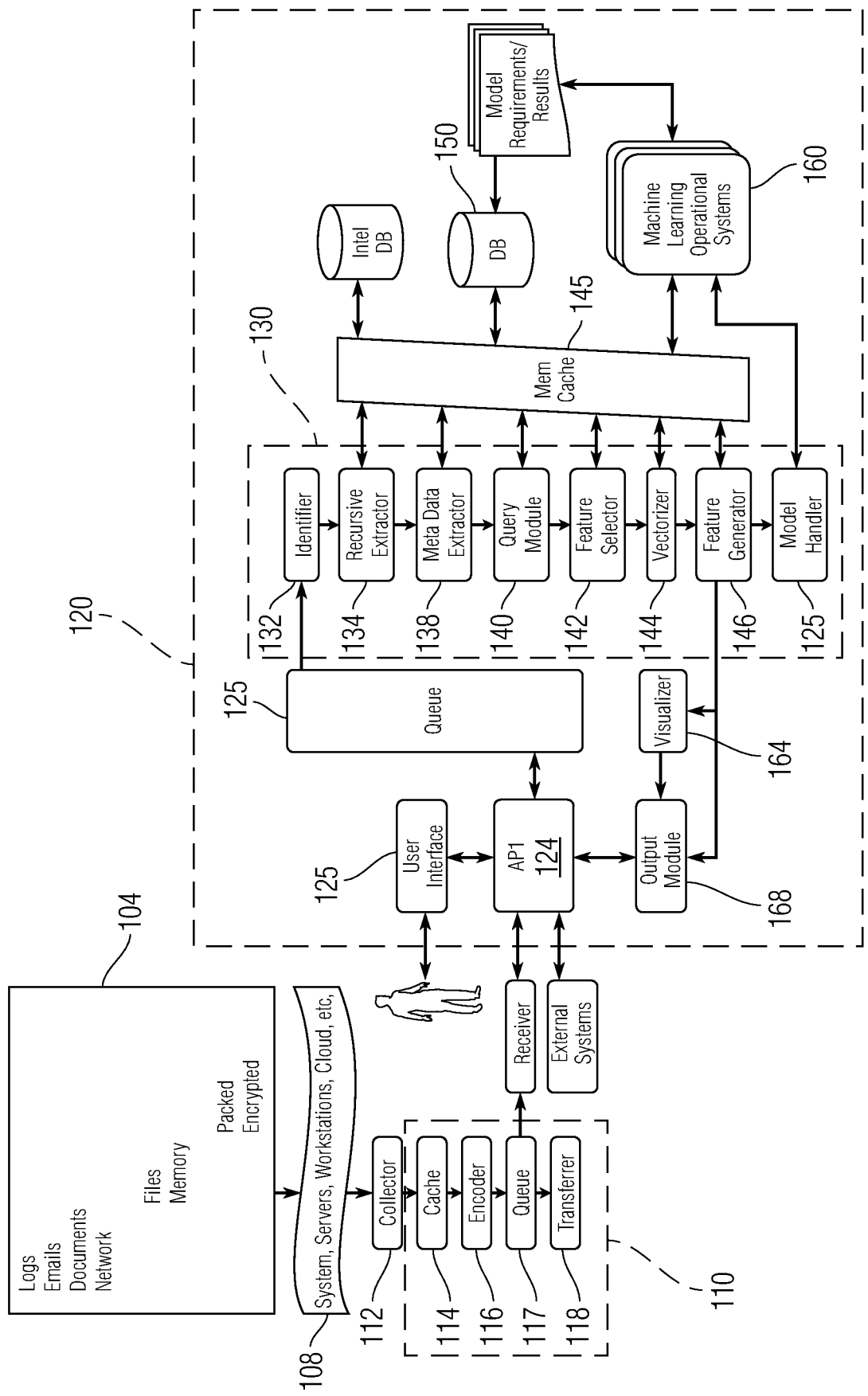
FIG. 1 is a schematic block diagram of a system for malicious URL identification according to an exemplary embodiment of the present invention.

Referring to FIG. 1, a schematic block diagram of an exemplary embodiment of a system for malicious URL pattern detection and classification according to the present invention is shown. System 100 comprises one or more computing devices having processors configured to execute a group of related program modules. System 100 is conceptually divided into a collector node 110 and a main node 120, which can be embodied (executed) using separate computing devices or processors. Alternatively, the collector node 110 and main node 120 can be executed by a single processor or computing device. The collector node 110 executes a series of modules that collets and processes relevant source data 104 obtained from a plurality of computing resources 108 in which files are stored or linked. The front end 110 includes a collector module 112 that is configured to retrieve data from the computing resources 108, which can include a wide range of computing platforms such as servers, workstations and other computing device located on internal or external networks, such as the "cloud." In some implementations, the collector module 112 can be configured to retrieve files 104 from a specific source location such as a file share associated with cloud-based services, servers, desktops, mobile systems and devices, databases, and specific applications that store files. The collection module 112 can be configured to collect files of specific types, based on a rule base configuration that identifies the systems or devices to collect from, the file types, names, and extensions, and related criteria based on file type creation or modification timestamps, permissions, or sizes.

The relevant source data files 104 that can include malicious URL patterns comprise a wide variety of original source types. Example source data 104 files can include one or more of files, logs, or network traffic captures in which URLs are directly present or embedded as part of some process or function. It is noted that the relevant source data can be presented in an obscured form and can be embedded, encrypted, obfuscated, packed and can be generated from domain generation algorithms (DGA). These techniques to obscure or hide data that might otherwise reveal a malicious URL are taken into account in the machine learning pattern identification disclosed herein.

Source data obtained from the device sources by the collector module 112 is passed to a cache module 114. The cache module 114 is configured to execute a hash function, such as MD5, SHA1, SHA2, etc., to uniquely identify each file received from the collector module 112. Once a file hash is computed, the cache module 114 performs a lookup of the hash in cache memory to see if the file has been analyzed before. If the hash is found in the lookup procedure, then a response is provided, allowing the cache module to discard the currently reviewed file. Otherwise, the file hash is stored and the file is passed to an encoder module 116 for encoding.

The operations of the cache module 114 prevents duplication of efforts by avoiding analyzing the same file more than once.

Figure 2:
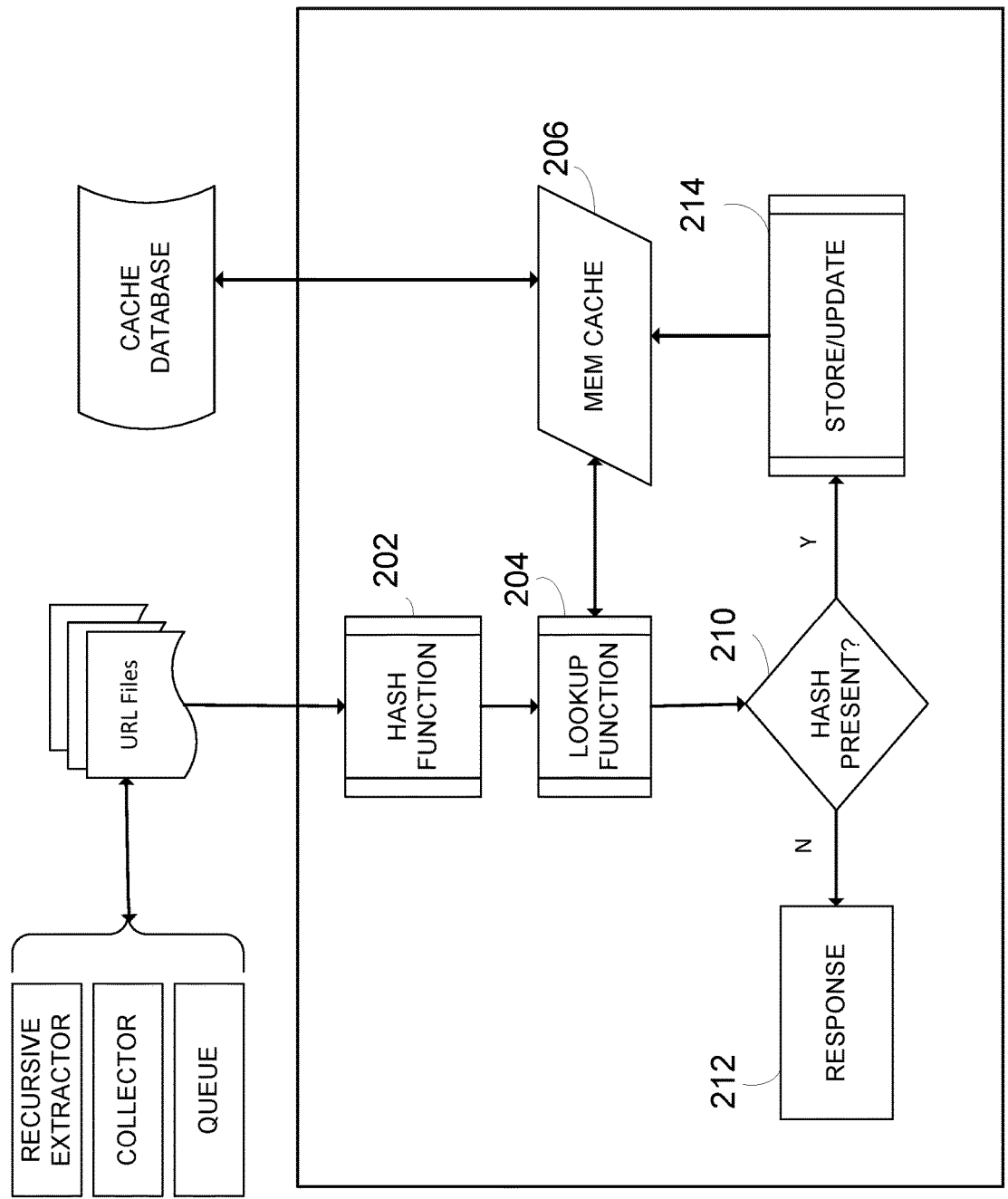
FIG. 2 is a schematic flow diagram of an exemplary embodiment of the flow of functions performed by the cache module according to the present invention.

FIG. 2 is a schematic flow diagram of an exemplary embodiment of the flow of functions performed by the cache module 114 according to the present invention that can be used in the forensic analysis systems disclosed herein. As shown, artifacts received are input to a hash function 202, which, as noted, can be a standard hash function well-known in the art such as MD5, SHA1, SHA2. The hash is passed to a lookup function 204 which access memory cache 206 to determine if the hash has been generated previously. In some implementations, the memory cache can periodically load data to a cache database 208, which, in turn, can upload data to a database. If it is determined (flow element 210), from the results of the lookup function that the hash is already present, e.g., due to a match with data in a memory or database, a response procedure 212 automatically generates a notification which can be passed to system operators. The notification can include text or other codes to inform the operators the ingested artifact has already been analyzed by the forensic system. If it is determined that the hash is new, e.g., due to there not being a match within at least a prescribed tolerance, the hash is stored 214 and the memory cache 206 is updated with an entry of the new hash.

Returning to FIG. 1, if a hash of the file is not found, it is passed to the encoder module 116 to create an identification for the new file. For this purpose, the encoding module 116 is configured to perform an encoding operation, such as simple byte level XOR based encoding with a key, or symmetric encryption algorithm with a key to encode the original file. The encoding allows the file to be transferred and stored without triggering alerts or active responses by system or network-based security apparatus or modules that detect out-of-policy files, malicious files, or patterns. After the encoding procedure, the encoder module 116 passes the encoded file artifact to a queue module 117 that works in tandem with a transfer module 118. The queue module 117 temporarily stores the encoded file in a queue until the transfer module 118 de-queues the file and transfers it to a queue module 122 of the central node 120 via an intermediary receiver and application programming interface (API) 124. The timing of the queuing and de-queuing is determined by the workflow pipeline. For example, when the queue module 122 of the central node 120 signals to the transfer module 118 of the collector node 110 that it is ready to accept a new file for processing, the transfer module 118 is prompted to upload the file to the queue module 122 of the central node. It is noted that a user interface 125 also interacts with the API 124 of the central node. The user interface 125 enables operators to submit URL files and requests directly to the API 124 and enables user control and monitoring of processes of central node. More generally The API includes program code that when executed manages traffic between the end users and the rest of the URL identification system.

The queue module 122 temporarily stores submitted URL files to maintain an ordered flow of URL analysis procedures. For instance, if numerous analysis requests are received within a short span of time, the queue module 122 can provide for a first-in first-out (FIFO), last-in first-out (LIFO) or other known method for both ensuring that the system does not get overloaded and that every submission is processed. In addition, another cache queue module de-queues files from the queue and passes the file to a decoder module for decoding (both the cache and decoder modules are not shown for ease of illustration). The decoder module decodes the module using standard byte stream based XOR with a key or symmetric encryption with a key and passes it to back to the cache module. The cache module analyzes the file for duplicate effort as noted above. If the file has not been analyzed, the file artifact is passed back to the queue 122 until the file is de-queued by the analytic module 130.

Submissions are delivered from the queue module 122 in an orderly flow to the analytic module 130 of the system which encompasses a number of sub-modules that perform various pre-processing on the retrieved files to prepare data suitable as input to various machine learning algorithms. The first sub-module of the analysis node is an identifier module 132. The identifier module 132 is configured to parse the file received from the queue module 122 into a byte-stream and to identify the contents of the file as a specific type with a specific format. Additionally, the identifier module 132 is configured to interrogate the file internally utilizing various methods such as byte-stream based "magic header" matching via tables of known file signatures, format indicators, machine and human linguistic syntax analysis to further analyze the file for various characteristics such as for URL links and embedded links. These techniques are used to further identify embedded files, objects, streams, text data, general executable byte-code patterns, and random or encrypted byte patterns that can be present in the file. Identifications are stored in a central intelligence database 150 via an intermediate memory cache 145.

As the embedded links are identified, the file is passed to a recursive extractor module 134 ("recursive extractor") that is configured to extract the embedded items from the file recursively. The recursive extractor 134 continues to break down the file into component parts or artifacts until all embedded artifacts have been extracted and no further meaningful data can be obtained from the original file (i.e., the file has been broken down into its minimal constituent elements). One way this can be determined is when an extraction step yields the same artifacts and data as a previous extraction step, indicating that no further artifacts can be yielded from the file. Once each file is reduced down to a non-reducible level, it is passed to a metadata extractor module 136 ("metadata extractor") that is configured to extract any additional metadata from the file and artifacts such as, but not limited to, URLs, string patterns, byte-code patterns, magic identifiers, author, creation timestamps, modification timestamps, programming language syntax identification, human language identification, domains, IP addresses, MAC addresses, Geo-Location identifiers, phone numbers, physical addresses, etc. The extracted metadata is stored in the central database 150. From the metadata extractor 136, the file and artifact data are passed to an additional query sub-module 138. The query module 138 is communicatively coupled to the central database 150 and to other external sources of pertinent to malicious URL identification and classification. The external sources are collectively represented and referred to as Intel database 160. The query module 138 collects all results obtain from the queries into a single dataset or multiple datasets for feature selection.

Figure 3:
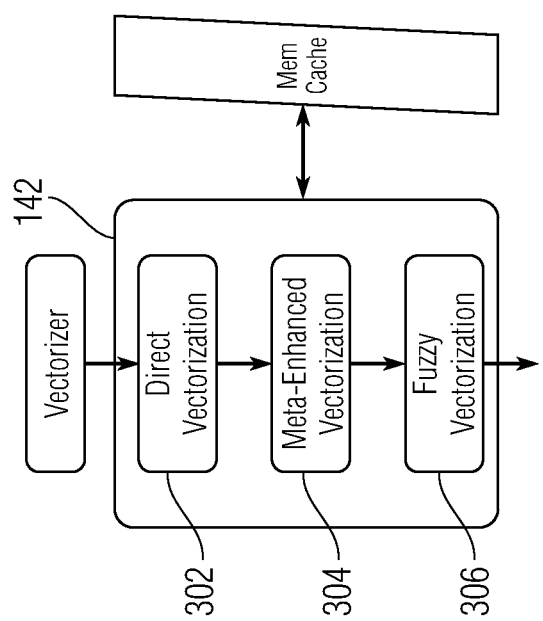
FIG. 3 is a schematic block diagram of a vectorizer module that vectorizes data using multiple techniques according to an embodiment of the present disclosure.

The feature selector module 140 is configured to select data sets or data points from within the newly collected data sets obtained by the query module 138 and to establish a sub-set of data sets or data points for analysis by a vectorizer module 144. FIG. 3 is a schematic diagram of a vectorizer module according to an embodiment of the present disclosure. As depicted, the vectorizer module 144 executes three different vectorization methods (sub-modules) direct vectorization 302, meta-enhanced vectorization 304, and fuzzy vectorization 306 to convert the data sets or data points into vectorized data sets or data points for proper ingestion and computation. Direct vectorization is a direct mapping of the specific byte values of each character of an artifact (e.g., a URL) from a text, UTF-8 or UTF-16 based value into a vector as normally defined in frameworks such as Tensorflow or MXNet. Metadata can include the URL current resolved IP address, autonomous system number (AS), hosting provider, domain owner, top-level domain, HTTPS certification metadata, for instance.

In meta-enhanced vectorization, meta-data can be combined with the URL as part of the vectorization. Meta-enhanced vectorization can be performed in different modes. For example, in a brute force mode, all permutations of the transformed bytes from the URL and all associated metadata are permuted across to generate all possible vectorizations that are possible. In a set specific mode, a specific set of selected meta-data, the byte lengths of the selected metadata, and the mode of the permutation are selected by the operator. Fuzzy vectorization is a derivative of the meta-enhanced vectorization in which additional intelligence data is looked up and related to the URL. All associated meta-data used to identify potential URL's with the same domain, IP, owner, AS, etc. that may have had malicious activities within a set period of time in the past can be added to the vectorization utilizing the configurations set in the same manner as brute force or set specific as noted above.

The different vectorization methods can be executed simultaneously or in series, and the vectorizer module 142 can be configured to execute all of the method or only a subset of them depending on operator input. All vectorizations are stored in the central database 150 and made available for analysis by following modules, by operators and more generally for future correlations and analyses. The vectorized data sets output by the vectorizer module are provided to the feature generator module 144.

Figure 4:
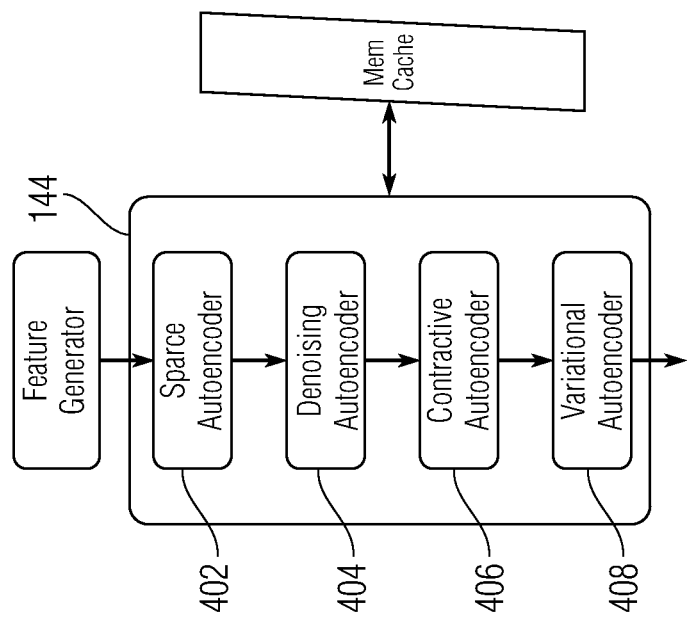
FIG. 4 is a schematic block diagram of an autoencoder module that generates features using multiple techniques according to an embodiment of the present disclosure.

FIG. 4 is a schematic diagram of a feature generator module 144 according to an embodiment of the present disclosure. As depicted, like the vectorizer module 142, the feature generator module 144 executes a plurality of autoencoding algorithms. The autoencoding algorithms generally serve to reduce the dimensionality of the data, effectively compressing the vectorized data, which can contain numerous distinct fields (e.g., hundreds or thousands), into a more information-rich form. In the embodiment shown, the feature generator module 144 includes a sparse autoencoder 402, a denoising autoencoder 404, a contractive autoencoder 406, and a variational autoencoder 408 which employ different compression techniques on the vectorized data sets or data points to generate machine learning ready features. Each of these encoders comprises code that executes in a processor to perform their respective functions. The autoencoders 402-408 techniques can themselves utilize unsupervised machine learning techniques (e.g., neural networks) which enable the feature generator module to learn optimal ways to compress the data. Since all four different techniques are generally executed, simultaneously or in sequence, the different outputs of each technique can be compared, which can reveal important features of the data sets. Importantly, the autoencoding techniques do not require a prejudgment as to which features of the data are most relevant, as the techniques determine this in an autonomic manner.

More specifically, the sparse autoencoder 402 employs a loss function that is constructed so that activations are penalized within a layer, which has the effect of reducing the dimensionality of the data. A sparsity constraint can be imposed with L1 regularization or a KL divergence between expected average neuron activation to an ideal distribution p. The denoising autoencoder 404 randomly converts some of the input to zero in order to avoid undesired outputs of the identity and null functions. The contractive autoencoder 406 is configured by code to avoid overfitting to the input data by adding a regularizer (penalty) term to whatever cost function is being minimized. The variational autoencoder 408 introduces regularization to avoid overfitting in another way, by encoding input vales as distributions rather than as unique values. All feature sets generated by autoencoders 402-408 are stored in the central database 150 and made available ingestion by following modules, as well as for current and future operations and analysis by operators.

After features have been generated by the autoencoders 402-408 of the feature generation module 144, a model handler 146 generates one or more models based on user-input configuration schema. The models comprise a model structure, hyperparameters, and specific algorithms. The model handler 146 delivers the set parameters of the selected model(s) to a machine learning operational systems provider 160 (ML implementer) to implement the models for training or prediction. The "models" referred to here are artificial intelligence or machine learning algorithms. Such models can include, but are not limited to, Bayesian, k-Nearest Neighbor (kNN), Support Vector Machines (SVM), and deep learning networks such as convolutional neural networks (CNNs), recurrent neural networks (RNNs), Long Short-Term Memory Networks (LSTMs), Adaboost, Gradient Boosting Machines.

Many of the models are supervised machine learning algorithms (or combinations thereof). Supervised machine learning algorithms employ forward and backward propagation, a loss function and an optimization algorithm such as gradient descent to train a classifier. In each iteration of the optimization algorithm on training data, outputs based on estimated feature weights are propagated forward and the output is compared with data that has been classified (i.e., which has been identified by type). The estimated weights are and then modified during backward propagation based on the difference between the output and the tagged classification as a function of the code used to implement this aspect of the ML algorithm. This occurs continually until the weights are optimized for the training data. Generally, the machine learning algorithm is supervised meaning that it uses human-tagged or classified data as a basis from which to train. However, in a prefatory stage, a non-supervised classification algorithm can be employed for initial classification as well.

The model handler 146 selects model algorithms and determines specific structures and parameters to test the URL feature data. Operator-set configurations specify which machine learning approaches are to be used and also whether the model approach will use new, untrained models or pre-trained models (which can then be retrained and tested). The operator can enable all approach selections or a subset of approaches. It is noted that the model handler 146 can select a model for training based on one or more data sets from the source data or alternatively, can select a trained model for execution to assess whether particular URL data is malicious. The model handler also choses the optimizer which can include gradient decent and its variants such as batch gradient descent, ADAM optimization, and second-order optimizers. Structural features can include the number of layers (regular and hidden) in a neural network, and the types and number of activations of each layer, the optimization algorithm employs hyperparameters which include such features as the learning rate, number of epochs (loops of optimization), training data batch size, type and weighting of regularization, among others. All of these configuration and parameters can be selected and updated by operators of the system and then implemented by executing code associated with the model handler 146, which code configures the model handler to select a model to test the URL. Each module is designed to receive as input configuration parameters as defined per session or project that the analyst is investigating. The configuration parameters are grouped for vectorizers, feature generators, models, and training/testing. Each module uses the configuration parameters to determine selections for use, including mode, mixture of selections, and variations (i.e., of vectorizing and feature generation techniques, and machine learning model). The configuration parameters also determine when a model passes (successfully meets a threshold) or runs out of time. Configuration parameters are stored as JSON (JavaScript Object Notation) objects for each project or session. In general, the configuration parameters provide guidance and limits as to the approach taken by each module in succession in order to limit the extent of resources being utilized.

The model handler 146 can be configured to select model structures and hyperparameters according to different modes. In a brute force mode, the handler permutes across a set range of all possible values appropriate to each selected model. In a second mode, a range is preselected, and the model handler selects only values from within the set range of values for model hyperparameters, structure, layers, etc. per each machine learning approach and selected models. In addition, a time limit for model evaluation can be set by the operator, which limits the computations of the possible structure and hyperparameter values. The operator can select among the values computed prior to the time limit. The values are dependent on the machine learning approach taken, such as Bayesian, Multi-Variate Bayesian, KNN, SVM, and many others within the Deep Learning approaches.

The machine learning operational systems provider 160 (ML implementer), which can be local or cloud-based, returns the results of the training or prediction to the model handler 146. Using code executing in the processor, the model handler 146 analyzes the outputs of the ML implementer 160 and based on the analysis determines if the training meets threshold criteria configurable by the operator. The threshold criteria typically pertains to the measured accuracy of a model in classifying URL data as malicious or non-malicious in an expected way. If the training does not meet the set criteria (i.e., is not sufficiently accurate), the model handler initiates an additional round of feature selection starting at the query module 138. Alternatively, if the threshold criteria are met, the model handler 146 can accept the results and deliver them onward for output and monitoring. Over time, the model handler 146 can generate numerous different models for the ML implementer 160 to train, and the results of the different models can be analyzed and compared.

More specifically, the testing can involve evaluating whether the model's results meet the criteria to be declared a useful or successful model. These are based on accuracy, balanced accuracy, precision, recall, and variations of the confusion matrix. Variations of the confusion matrix can include Mathew's Correlation Coefficient (MCC), True Positive/Negative rates, Precision Positive/Negative Predictive rates, Fowlkes-Mallow index, informedness, markedness (delta-p), etc. and models with the highest ratings, based on metrics set by the operator are deemed useful or successful models. Models with the highest ratings or top-n models can be configured to be selected as the "winner" models.

Figure 6:
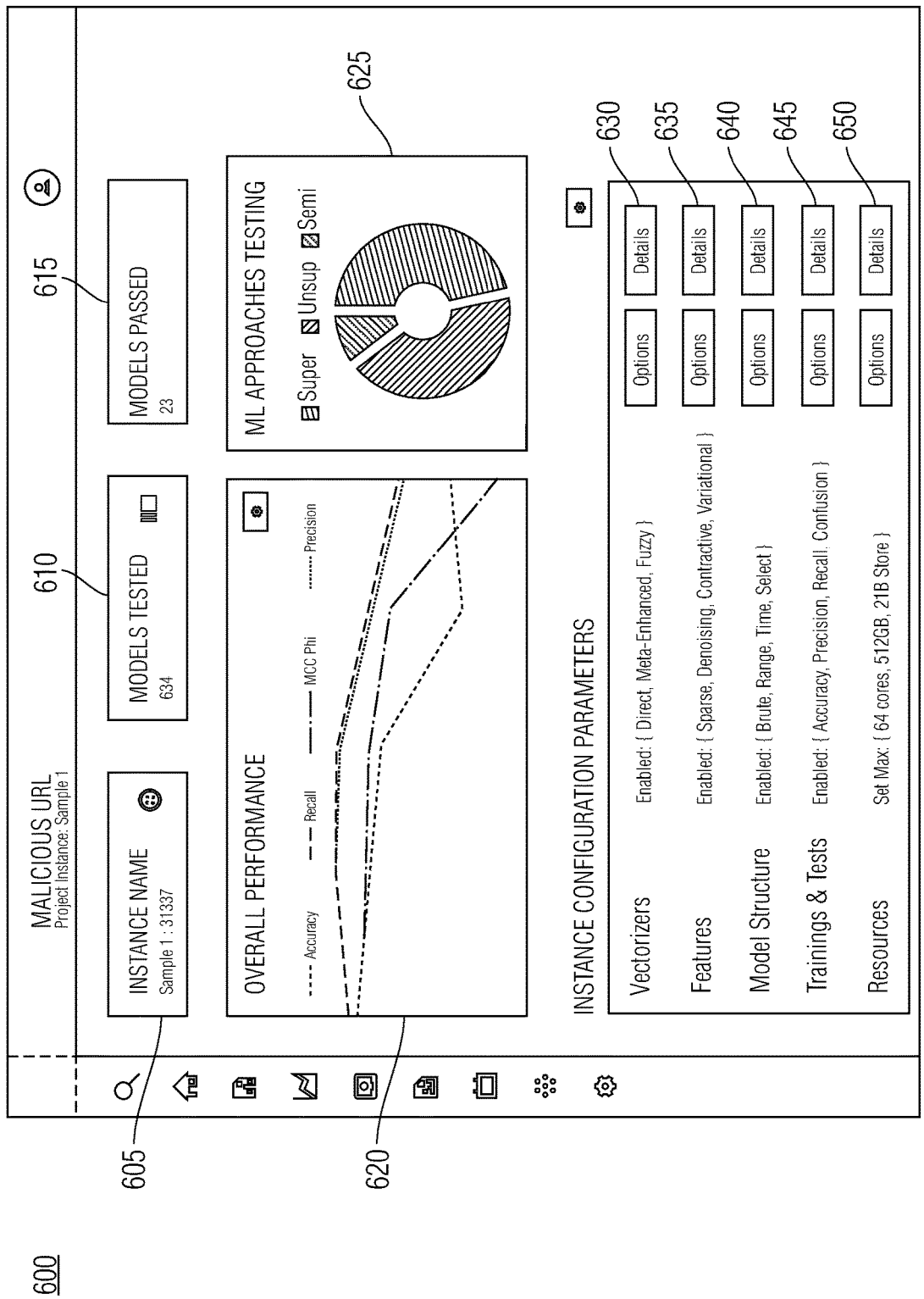
FIG. 6 is an example user interface for configuring and monitoring the system for malicious URL pattern detection and classification according to the present disclosure.

The results of each and every step in the process are returned to a visualizer module 164 and an output module 168. The visualizer module 164 converts aspects of the training model and training results into a format that can be viewed by operators and passes the results to an output module 168. The output module provides the graphical results to the user interface 125 enabling operators to continually monitor and review the results of the model generation and training. FIG. 6 shows a screen of an example user interface for configuring and monitoring the system for malicious URL pattern detection and classification according to the present disclosure. Toward the top of the interface screen 600, the interface includes a project element 605 that displays the name of the current project (e.g., "Sample 1") and the size of the data set being investigated. Adjacent the project element 605 are a model tested indicator 610 and a model passed indicator 615. As their names imply the model tested indicator 610 displays the number of models tested using the project data, and the model passed indicator 615 displays the number of models tested that passed the accuracy criteria. The area of the screen directly below includes a performance display element 620 and a model approach element 625. The performance element 620 displays (in a graph or other form) performance statistics regarding the models tested in the project such as accuracy, precision and recall. The model approach element 625 is a pie chart that displays the fractions of models that fall into supervised, semi-supervised or unsupervised categories. This data can also be displayed in alternative forms.

The area below the performance and model approach elements includes a set of control elements that enable the operator to configure the modules discussed above and other settings. For example, a vectorizer control element 630 enables the operator to select, activate or disable one or more vectorization operations. A feature generator control element 635 enables the operator to select, activate or disable one or more autoencoder algorithms. A model structure element 640 enables the operator to select, activate or disable one or more of selecting structures and hyperparameters. A training and testing control element 645 enables the operator to set options for displaying performance, among other functions, and a resources control element 650 enables the operator to set an extent of computational resources to be allocated to the training and testing procedures of the project.

It is to be understood that the user interface screen 600 is only one of many different screen through which the user provides inputs for configuring, controlling and monitoring the numerous parameters and options available. For example, there will be a different user interface screen presented for each type of machine learning algorithm, as each algorithm requires different inputs, parameters and settings. The interface of FIG. 6 as well as the types of controls illustrated can be used with any of the embodiments described herein.

The system described above can solve the problem of identifying and classifying malicious URLs in cases in which it is not known which the optical data set, data features, algorithmic approach, and model structure would be most effective. The training results provided by the visualizer 164 and output modules 168 allow operator teams to effectively and efficiently identify important datasets and dataset features that directly influence the selected algorithmic approach, the model structure and hyperparameters. In turn, the system enables operators to evaluate multiple machine learning models to find the best collection of datasets, features, algorithms, and models to identify and classify malicious URLs. For example, malicious URLs that escape classification in certain models can be detected by others; such differences in outcomes can provide insight to the monitoring operators regarding how bad actors are attempting to circumvent detection, and which techniques prove most effective in detecting such attempts.

Figure 5:
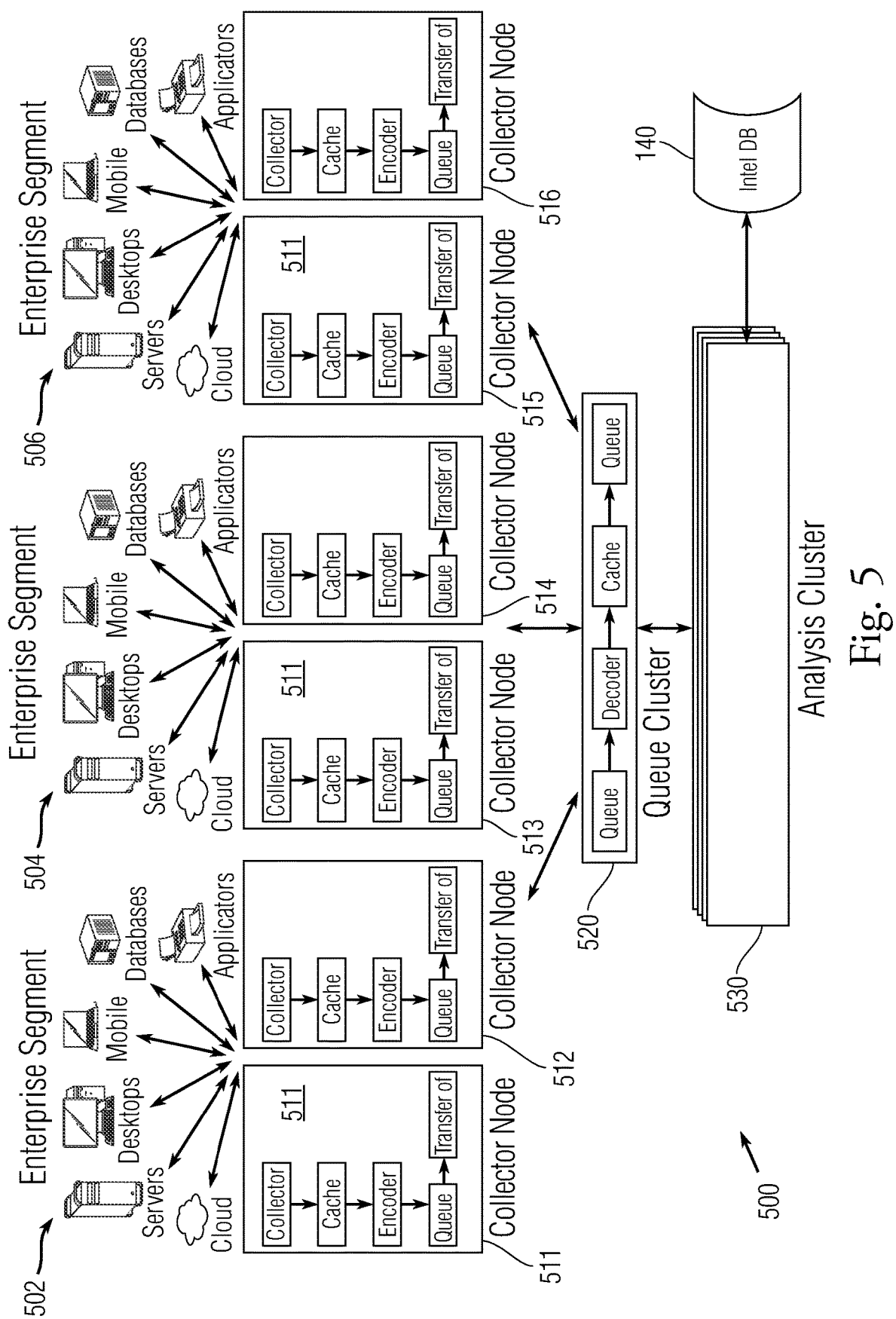
FIG. 5 is a schematic block diagram of another embodiment of a system for malicious URL identification according to an exemplary embodiment of the invention.

FIG. 5 depicts another embodiment of a system for malicious URL identification and classification that employs a plurality of collector nodes and clusters of queue and analysis nodes to provide load balanced and simultaneous analysis for a large enterprise. The system 500 includes three enterprise segments 502, 504, 506, each comprising a plurality of computing resources. Segment 502 supplies artifacts to collector nodes 511 and 512. Segment 504 supplies artifacts to collector nodes 513 and 514, while segment 506 supplies artifacts to collector nodes 515 and 516. The collector nodes 511-516 can be similar to those described above. Collector nodes 511-516 send the collected files to a central queue cluster 520. The queue cluster can include a plurality of queue, decoder and cache modules that can each operate similarly to the modules 114-117 described above with respect to FIG. 1, operating at the direction of code executing in a processor. The cluster of modules of the queue cluster 520 operate in parallel to process large request loads. The queue cluster is configured by code to queue requests for an analysis cluster 530 which include a plurality of analysis modules similar to the analysis module 130 described above. The plurality of analysis modules in the analysis cluster 530 also operate in parallel to provide load balanced, simultaneous analysis of file artifacts to handle higher volumes of file artifacts. The analysis cluster 530 delivers analysis output to the central intelligence database 150.

It should be understood that all of the system components described herein such as collector nodes, analysis modules, etc. are embodied using computer hardware (microprocessors, parallel processors, solid-state memory or other memory, etc.), firmware and software as understood by those of skill in the art and can include servers, workstations, mobile computing devices, as well as associated networking and storage devices. Communications between devices can occur over wired or wireless communication media and according to any suitable communications system or protocol.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium comprising instructions which, when executed by a computer system, cause the computer system to carry out a method of malicious Uniform Resource Locator ("URL") identification and classification, the method comprising:
    receiving a file including a potentially malicious URL from a source;
    extracting features from the file;
    performing an initial identification of a type of URL in the file;
    recursively extracting data embedded in the file using embedded features present within the file, wherein data is extracted until all embedded data has been fully extracted from the file;
    extracting meta-data from the file and artifacts obtained from recursive extraction;
    performing a query on a database based on the URL in the file and extracted meta-data;
    after performing the query, vectorizing the extracted features using a plurality of vectorization techniques into vectorized feature data;
    generating URL data features with reduced dimensionality from the vectorized feature data using a plurality of autoencoding techniques;
    selecting an artificial intelligence/machine learning (AI/ML) model to analyze the URL data features with reduced dimensionality;
    receiving results of an execution of the selected AI/ML model that includes an identification and classification of the potential malicious URL; and
    providing a visualization of results of the execution of the selected AI/ML model.

2. The non-transitory computer-readable medium of claim 1, wherein the plurality of vectorization techniques includes direct vectorization, meta-enhanced vectorization and fuzzy vectorization.

3. The non-transitory computer-readable medium of claim 1, wherein the plurality of autoencoding techniques include sparse, denoising, contractive, and variational autoencoding.

4. The non-transitory computer-readable medium of claim 1, wherein the selected AI/ML model comprises a supervised machine learning model.

5. The non-transitory computer-readable medium of claim 4, wherein a model handler determines parameters for execution of the selected supervised machine learning model including at least one of a learning rate, a number of epochs, a number of layers of a neural network, and a batch size.

6. A system for identifying and classifying malicious Uniform Resource Locators ("URL") comprising:
    one or more processors, the processors having access to program instructions that when executed, generate the following modules:
    a queue module configured to receive a file including a potentially malicious URL from a source;
    a feature selector module configured to select features of interest to identifying URLs extracted from the file received by the queue module;
    an identification module configured to perform an initial identification of a type of URL in the file;
    a recursive extractor module configured to recursively extract data embedded in the file using embedded features present within the file, wherein data is extracted until all embedded data has been fully extracted from the file;
    a meta-data extractor module configured to extract meta-data from the file and artifacts obtained from the recursive extractor module;
    a query module configured to perform a query on a database based on the URL in the file and extracted meta-data;
    a vectorizing module configured to generate vectorized feature data from the features selected by the feature selector module using a plurality of vectorization techniques;
    a feature generation module configured to generate URL data features with reduced dimensionality from the vectorized feature data using a plurality of autoencoding techniques;
    a model handler module configured to select an artificial intelligence/machine learning (AI/ML) model to analyze the URL data features with reduced dimensionality, to transmit the model for execution, and to receive the results of the execution of the selected AI/ML model;
    a visualizer module configured to provide a rendering of results of the execution of the selected AI/ML model.

7. The system of claim 6, wherein the vectorizer module is configured to vectorize feature data using direct vectorization, meta-enhanced vectorization and fuzzy vectorization.

8. The system of claim 6, wherein the feature generation module is configured to generate URL data features using sparse, denoising, contractive, and variational autoencoding.

9. The system of claim 6, wherein the selected AI/ML model selected by the model handler module comprises a supervised machine learning model.

10. The system of claim 9, wherein the model handler module is configured to determine parameters for execution of the selected supervised machine learning model including at least one of a learning rate, a number of epochs, a number of layers of a neural network, and a batch size.

11. The non-transitory computer readable medium of claim 1, wherein the step of recursively extracting data embedded in the file occurs without executing a URL in the file.

12. The system of claim 6, wherein the recursive extractor module is configured to recursively extract data embedded in the file without executing a URL in the file.

* * * * *